United States Patent
Aaltio (10) Patent No.: US 9,225,262 B2
(45) Date of Patent: Dec. 29, 2015

(54) MULTI-LEVEL INVERTER APPARATUS AND METHODS USING VARIABLE OVERCURRENT RESPONSE

(75) Inventor: Tuomas Esko Aaltio, Helsinki (FI)

(73) Assignee: Eaton Corporation, Cleveland, OH (US)

( * ) Notice: Subject to any disclaimer, the term of this patent is extended or adjusted under 35 U.S.C. 154(b) by 269 days.

(21) Appl. No.: 13/537,316

(22) Filed: Jun. 29, 2012

(65) Prior Publication Data

US 2014/0003103 A1 Jan. 2, 2014

(51) Int. Cl.
*H02M 1/32* (2007.01)
*H02M 7/487* (2007.01)
*H02H 3/08* (2006.01)
*H02H 7/122* (2006.01)

(52) U.S. Cl.
CPC ............... *H02M 7/487* (2013.01); *H02H 3/08* (2013.01); *H02H 7/1227* (2013.01); *H02M 1/32* (2013.01)

(58) Field of Classification Search
CPC ....... H02H 7/1227; H02H 7/122; H02H 7/10; H02M 1/32
USPC .......... 363/43, 56.03, 56.07, 56.1; 361/96–97
See application file for complete search history.

(56) References Cited

U.S. PATENT DOCUMENTS

| | | | |
|---|---|---|---|
| 4,706,177 A | 11/1987 | Josephson | |
| 4,862,308 A * | 8/1989 | Udren | 361/45 |
| 5,208,720 A * | 5/1993 | Fraisse et al. | 361/94 |
| 5,361,196 A | 11/1994 | Tanamachi et al. | |
| 6,795,323 B2 | 9/2004 | Tanaka et al. | |
| 6,838,925 B1 | 1/2005 | Nielsen | |
| 7,145,268 B2 | 12/2006 | Edwards et al. | |
| 7,208,883 B2 * | 4/2007 | Maru et al. | 315/226 |
| 7,573,732 B2 | 8/2009 | Teichmann et al. | |
| 2012/0074912 A1 * | 3/2012 | Namai et al. | 322/39 |
| 2013/0223114 A1 * | 8/2013 | Nakayama et al. | 363/55 |

FOREIGN PATENT DOCUMENTS

| EP | 1533888 | 6/2003 |
|---|---|---|
| EP | 1411624 | 4/2004 |
| WO | WO 2012056766 A1 * | 5/2012 |

OTHER PUBLICATIONS

Hafiz I H, Valsan S P; System and method for over-current protection in multi-level H-bridge inverter, abstract and drawing of India publication IN201100731I3, Sep. 2, 2011, 3 pages.*
Paatero; *Power Conversion Apparatus and Methods Employing Variable-Level Inverters*, U.S. Appl. No. 13/105,700, filed May 22, 2011, 10 Pages.
International Preliminary Report on Patentability, corresponding PCT App No. PCT/US2013/047283, mailed Dec. 31, 2014 (5 pages).
International Search Report and Written Opinion, corresponding PCT App No. PCT/US2013/047283, mailed Sep. 30, 2014 (8 pages).

* cited by examiner

*Primary Examiner* — Harry Behm
(74) *Attorney, Agent, or Firm* — Myers Bigel Sibley & Sajovec, P.A.

(57) ABSTRACT

An inverter includes a multilevel bridge circuit. A control circuit is operatively coupled to the multilevel bridge circuit and configured to detect an overcurrent for an output of the inverter, to generate a measure of a duration of the overcurrent and to selectively put an output of the bridge circuit in a first impedance state or a second impedance state based on the measure. The first and second impedance states may provide respective first and second impedances between the bridge circuit output and a neutral.

21 Claims, 9 Drawing Sheets

MULTI-LEVEL INVERTER APPARATUS AND METHODS USING VARIABLE OVERCURRENT RESPONSE

BACKGROUND

The inventive subject matter relates to power conversion circuits and methods and, more particularly, to inverter apparatus and methods.

UPS systems are commonly used in installations such as data centers, medical centers and industrial facilities. UPS systems may be used in such installations to provide backup power to maintain operation in event of failure of the primary utility supply. These UPS systems common have an "on-line" configuration including a rectifier and inverter coupled by a DC link that is also coupled to an auxiliary power source, such as a battery, fuel cell or other energy storage device.

UPS systems, motor drives and other power conversion devices commonly use an inverter that generates an AC output from a DC power source, such as a rectifier and/or battery. A "two level" bridge inverter may be use to selectively connected these DC buses to the output of the inverter to generate an AC voltage waveform. Multilevel inverters may provide for additional voltages between the DC bus voltages. Various multilevel inverter circuits are described, for example, in U.S. Pat. No. 5,361,196 to Tamamachi et al., U.S. Pat. No. 6,795,323 to Tanaka et al., U.S. Pat. No. 6,838,925 to Nielsen, U.S. Pat. No. 7,145,268 to Edwards et al, and U.S. Pat. No. 7,573,732 to Teichmann et al.

During operation, inverters may experience overcurrent conditions caused by output shorts and/or overloads. Conventional inverters may respond to overcurrent conditions by turning off bridge transistors while the overcurrent is present, which may result in current passing back to a DC bus via body diodes of the bridge transistors.

SUMMARY

Some embodiments of the inventive subject matter provide an inverter including a multilevel bridge circuit. The inverter further includes a control circuit operatively coupled to the multilevel bridge circuit and configured to detect an overcurrent for an output of the inverter, to generate a measure of a duration of the overcurrent and to selectively put an output of the bridge circuit in a first impedance state or a second impedance state based on the measure. The first and second impedance states may provide respective first and second impedances between the bridge circuit output and a neutral.

In some embodiments, the control circuit may be configured to put the bridge circuit output in the first impedance state when the measure indicates that the duration of the overcurrent is greater than a threshold and to put the bridge circuit output in the second impedance state when the measure indicates that the duration of the overcurrent is less than the threshold, wherein the first impedance is greater than the second impedance.

In some embodiments, the bridge circuit may include first and second switches having first terminals coupled to the bridge circuit output and first and second neutral clamping diodes coupled between the neutral and second terminals of the first and second switches, respectively. The control circuit may be configured to operate first and second switches to prevent conduction via the first and second neutral clamping diodes in the first impedance state and to support conduction via the first and second neutral clamping diodes in the second impedance state.

According to some embodiments, the control circuit may include a comparator circuit configured to generate an overcurrent indication signal responsive to a comparison of a current sense signal to a reference signal. The control circuit may further include an overcurrent characterization circuit configured to generate an overcurrent characterization signal based on a pulse width of the overcurrent indication signal and a bridge driver circuit configured to control the multilevel bridge circuit responsive to the overcurrent characterization signal. The bridge driver circuit may be further configured to receive a pulse width modulation signal and the overcurrent indication signal and may be configured to control the multilevel bridge circuit responsive to the pulse width modulation signal for a first state of the overcurrent indication signal and to control the multilevel bridge circuit responsive to the overcurrent characterization signal for a second state of the overcurrent indication signal. The inverter may further include a processor circuit configured to generate the pulse width modulation signal and the bridge driver circuit may include a fixed logic circuit, such as a complex programmable logic device (CPLD).

In additional embodiments, the control circuit may be further configured determine an elapsed time after the bridge circuit output enters the first impedance state and to transition the bridge circuit output to the second impedance state responsive to the elapsed time meeting a predetermined criterion. In some embodiments, the control circuit may be further configured to determine a direction of the detected overcurrent and to control transition of the bridge circuit output to the first and second impedance states based on the detected direction. In further embodiments, the control circuit may be configured to control transition of the bridge circuit output to the first and second impedance states based on the detected direction and a state of the bridge circuit.

Some embodiments of the inventive subject matter provide an inverter including a multilevel bridge circuit. A control circuit is operatively coupled to the multilevel bridge circuit and configured to detect an overcurrent and a direction thereof for an output of the inverter, to generate a measure of a duration of the overcurrent and to selectively put an output of the bridge circuit in a first impedance state or a second impedance state based on the measure and the detected direction. The control circuit may be configured to selectively put the bridge circuit output in the first impedance state or the second impedance state based on the detected direction and a state of the bridge circuit. The first impedance state may provide a first impedance between the bridge circuit output and a neutral and the second impedance state may provide a second impedance between the bridge circuit output and the neutral. The control circuit may be configured to put the bridge circuit output in the first impedance state when the duration of the overcurrent is greater than a threshold and to put the bridge circuit output in the second impedance state when the duration of the overcurrent is less than the threshold, wherein the first impedance is greater than the second impedance.

According to further embodiments, the control circuit may be configured to selectively put the bridge circuit output in the first impedance state or the second impedance state based on the measure when the detected direction indicates an absence of a backfeed and the control circuit may be further configured to constrain the bridge circuit output to transition to the first impedance state responsive to the detected overcurrent when the detected direction indicates a presence of the backfeed, irrespective of the measure of the overcurrent. The control circuit may be configured to detect the backfeed based on the detected direction and a state of the bridge circuit.

In some method embodiments, an overcurrent for an output of a multilevel inverter is detected. A measure of a duration of the overcurrent is generated. An output of a bridge circuit of the inverter is selectively transitioned to a first impedance state or a second impedance state based on the measure. The first and second impedance states may provide respective first and second different impedances between the bridge circuit output and a neutral.

In some embodiments, the bridge circuit output may be put in the first impedance state when the measure indicates that the duration of the overcurrent is greater than a threshold, and the bridge circuit output may be put in the second impedance state when the measure indicates that the duration of the overcurrent is less than the threshold, wherein the first impedance is greater than the second impedance. A direction of the detected overcurrent may be detected and the bridge circuit output may be transitioned to the first impedance state or the second impedance state based on the measure and the detected direction. The bridge circuit output may be selectively put in the first impedance state or the second impedance state based on the detected direction and a state of the bridge circuit.

Some embodiments provide an uninterruptible power supply (UPS) apparatus comprising inverters as described above and implementing methods as described above.

DETAILED DESCRIPTION OF EXEMPLARY EMBODIMENTS

Specific exemplary embodiments of the inventive subject matter now will be described with reference to the accompanying drawings. This inventive subject matter may, however, be embodied in many different forms and should not be construed as limited to the embodiments set forth herein; rather, these embodiments are provided so that this disclosure will be thorough and complete, and will fully convey the scope of the inventive subject matter to those skilled in the art. In the drawings, like numbers refer to like elements. It will be understood that when an element is referred to as being "connected" or "coupled" to another element, it can be directly connected or coupled to the other element or intervening elements may be present. As used herein the term "and/or" includes any and all combinations of one or more of the associated listed items.

The terminology used herein is for the purpose of describing particular embodiments only and is not intended to be limiting of the inventive subject matter. As used herein, the singular forms "a", "an" and "the" are intended to include the plural forms as well, unless expressly stated otherwise. It will be further understood that the terms "includes," "comprises," "including" and/or "comprising," when used in this specification, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this inventive subject matter belongs. It will be further understood that terms, such as those defined in commonly used dictionaries, should be interpreted as having a meaning that is consistent with their meaning in the context of the specification and the relevant art and will not be interpreted in an idealized or overly formal sense unless expressly so defined herein.

Figure 1:
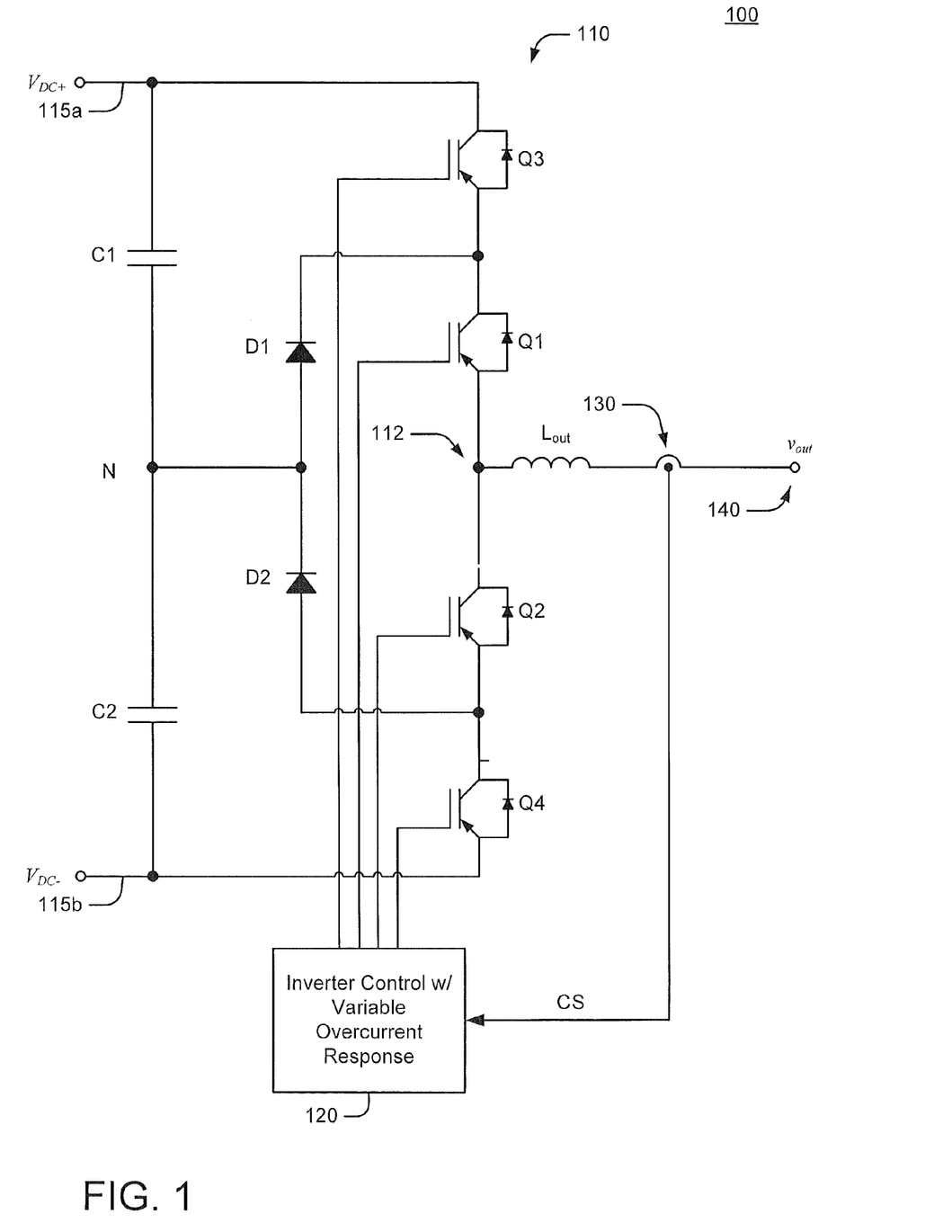
FIG. 1 is a schematic diagram illustrating an inverter according to some embodiments of the inventive subject matter.

FIG. 1 illustrates an inverter 100 according to some embodiments of the inventive subject matter. The inverter 100 includes a multilevel bridge circuit 110 coupled to first and second DC busses 115a, 115b and to an output inductor $L_{out}$. A first pair of serially connected transistors Q1, Q3 of the bridge circuit 110 is coupled between the first DC bus 115a and an inductor $L_{out}$. A second pair of serially connected transistors Q2, Q4 of the bridge circuit 110 is coupled between the second DC bus 115b and the inductor $L_{out}$. Respective first and second neutral clamping diodes D1, D2 couple respective nodes between the transistors of the respective pairs to a neutral node N. Respective capacitors C1, C2 are coupled between respective ones of the first and second DC busses 115a, 115b and the neutral node N.

It will be appreciated that the arrangement of the transistors Q1, Q2, Q3, Q4 illustrated in FIG. 1 is one conventionally used to implement a three-level inverter in which three voltages, i.e., the DC bus voltages $V_{DC+}$, $V_{DC-}$ and the voltage at the neutral node N, are applied to the output filter inductor $L_{out}$. The inverter arrangement illustrated in FIG. 1 is provided for purposes of illustration. It will be appreciated that embodiments of the inventive subject matter may be embodied in higher-order multilevel inverter arrangements.

As further illustrated, the inverter 100 further includes an inverter control circuit 120, which is configured to drive the first, second, third and fourth transistors Q1, Q2, Q3, Q4. In some embodiments, the inverter control circuit 120 may be configured to apply pulse-width modulated drive signals to the first, second, third and fourth transistors Q1, Q2, Q3, Q4 such an AC waveform $v_{out}$ is produced at an output terminal of the inverter 100. The inverter control circuit 120 is further configured to provide a variable overcurrent response based on a output current $i_{out}$ of the inverter 100, here shown as sensed by a current sensor 130 (e.g., a current transformer (CT) or similar device), which produces a current sense signal CS. In some embodiments, the inverter control circuit 120 may be configured to detect an overcurrent for an output of the inverter 100 based on the current sense signal CS, to generate a measure of the overcurrent and to responsively control the bridge circuit 110 to selectively put an output node 112 of the bridge circuit 110 in a first impedance state or a second impedance state based on the measure of the overcurrent.

For example, if the measure of magnitude indicates a relatively large overcurrent, the inverter control circuit 120 may turn off all of the transistors Q1, Q2, Q3, Q4 such that a relatively large impedance is provided between the bridge circuit output node 112 and the neutral N. Putting the bridge circuit 110 in such an "open" state may support a relatively low RMS current with a high peak current, with current decaying relatively quickly. If the measure of magnitude indicates a relatively smaller overcurrent, however, the inverter control circuit 120 may turn on the inside transistors Q1, Q2, thus providing current paths through the neutral clamping diodes D1, D2 such that a relatively lower impedance is provided between the inverter output node 112 and the neutral N. Such a "grounded" state may support relatively higher RMS current, but with controlled peak current and slower current decay.

It will be appreciated that the bridge circuit 110 shown in FIG. 1 is provided for purposes of illustration, and that any of a variety of other multilevel bridge circuits may be used in various embodiments of the inventive subject matter. These may include multilevel bridge circuits employing other types of switching devices than the insulated-gate bipolar transistors (IGBT's) shown in FIG. 1 and multilevel bridge circuits providing more levels than the three-level arrangement shown in FIG. 1, e.g., bridge circuits configured to support three or higher level operation. It will be further understood that the inverter control circuit 120 may, in general, be implemented using analog circuitry, digital circuitry (e.g., logic circuitry and/or computing circuitry, such as a microprocessor, microcontroller, digital signal processor (DSP) or the like) and combinations thereof.

Figure 2:
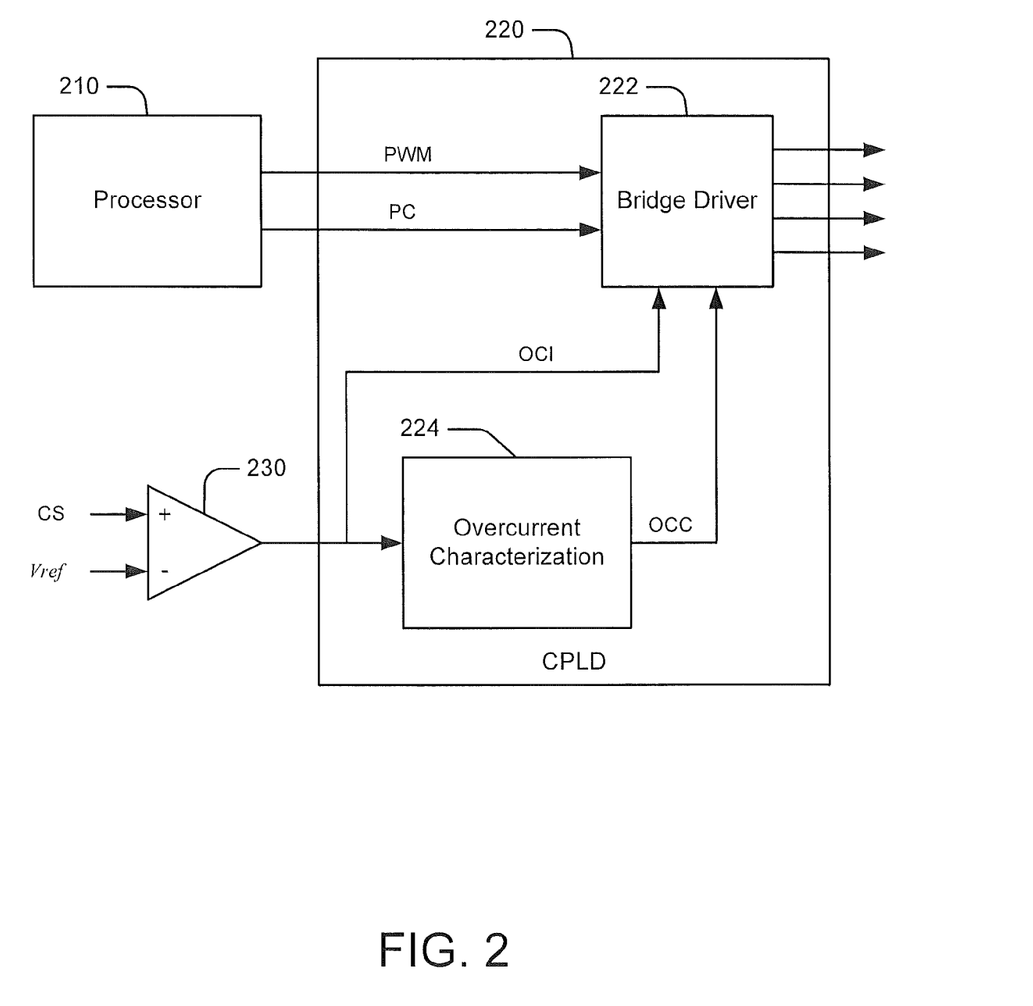
FIG. 2 is a schematic diagram illustrating an inverter control circuit for the inverter of FIG. 1 according to some embodiments.

FIG. 2 illustrates an exemplary implementation of an inverter control circuit 200 according to some embodiments. The control circuit 200 includes a processor, such as a DSP-based microcontroller, which is configured to generate a PWM command signal PWM and a polarity control signal PC. A bridge driver circuit 222, here shown implemented as a digital state machine in a complex programmable logic device (CPLD) 220, is configured to receive the PWM command signal PWM and the polarity control signal PC and to responsively generate gate drive signals, e.g., signals to be applied to gate terminals of the transistors Q1, Q2, Q3, Q4 of the bridge circuit 110 of FIG. 1. In particular, the bridge driver circuit 222 may drive the bridge circuit transistors using duration information provided by the PWM command signal PWM, with the polarity command signal PC indicating which devices are to be active in various phase of multi-level operation. Examples of pulse-width modulated multi-level inverter operations are described, for example, in the aforementioned U.S. Pat. No. 5,361,196 to Tamamachi et al., U.S. Pat. No. 6,795,323 to Tanaka et al., U.S. Pat. No. 6,838,925 to Nielsen, U.S. Pat. No. 7,145,268 to Edwards et al. and U.S. Pat. No. 7,573,732 to Teichmann et al. Some embodiments may also use variable level inverter control techniques described in copending U.S. patent application Ser. No. 13/105,700, entitled "Power Conversion Apparatus and Methods Employing Variable-Level Inverters" (Attorney Docket No. 9060-298), filed May 22, 2011.

The control circuit 200 also includes an overcurrent detector circuit, here shown as including a comparator circuit 230 configured to receive a current sense signal CS representative of the output current of the inverter. The comparator circuit 230 generates an overcurrent indication signal OCI based on a comparison of the current sense signal CS to an overcurrent threshold reference signal Vref. The overcurrent indication signal OCI indicates whether the inverter current is above or below the overcurrent threshold.

The control circuit 220 further includes an overcurrent characterization circuit 224, here shown as also implemented in the CPLD 220. The overcurrent characterization circuit 224 is configured to generate an overcurrent characterization signal OCC indicating whether the detected overcurrent is a "high" overcurrent or a "low" overcurrent. As explained in detail below with reference to FIGS. 4 and 5, this signal may be generated by, for example, measuring a pulse width of the overcurrent indication signal OCI produced by the comparator circuit 230, which serves as a measure of the amount of overcurrent. Responsive to the overcurrent indication signal OCI indicating the presence of an overcurrent, the bridge driver circuit 222 may control the manner in which it generates the gate drive signals based on the overcurrent characterization signal OCC produced by the overcurrent characterization circuit 222 to select between, for example, one of the "open" and "grounded" states described above with reference to FIG. 1.

Figure 3:
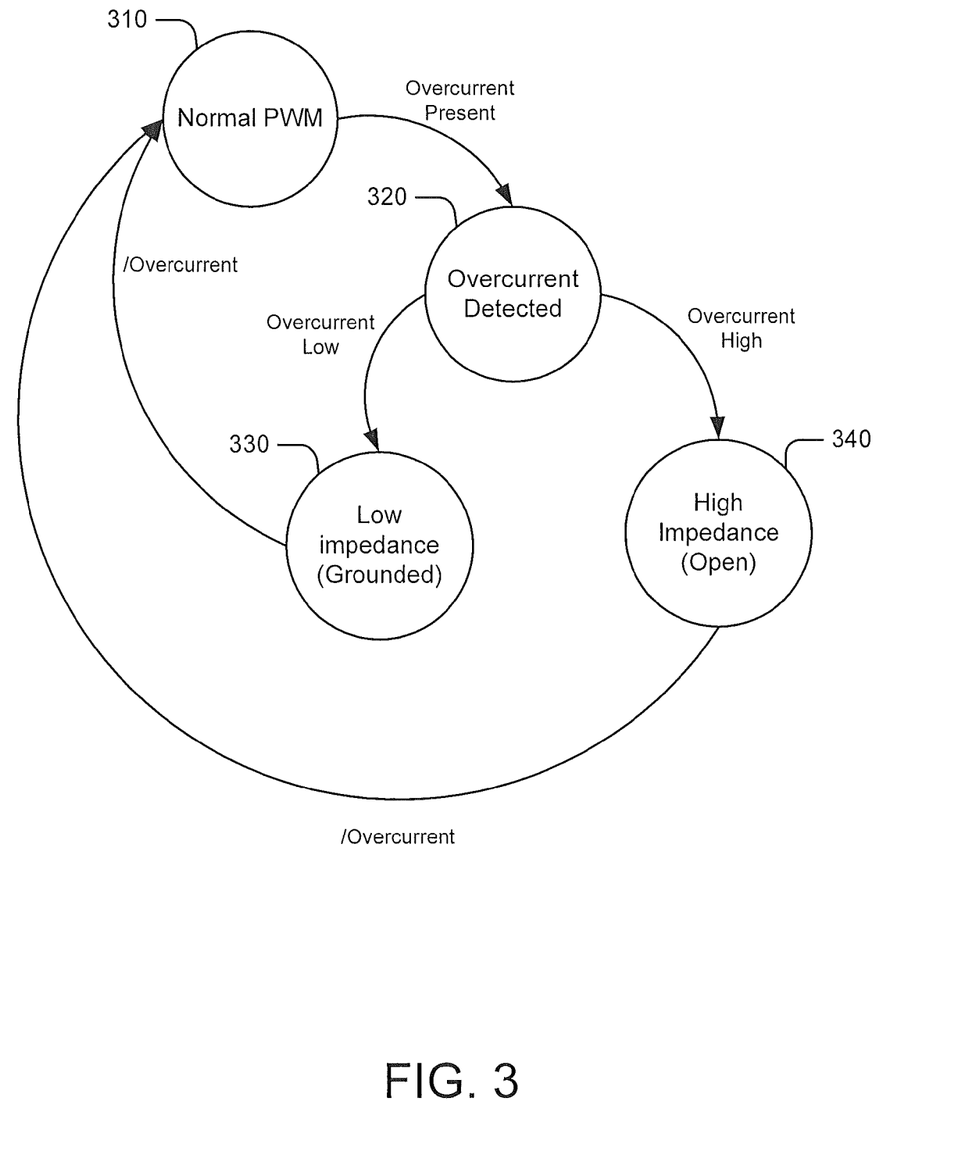
FIG. 3 is a state diagram illustrating operations of the inverter control circuit of FIG. 2 according to further embodiments.

FIG. 3 is a state diagram illustrating operations of the bridge driver circuit 222 of FIG. 2 according to some embodiments. The bridge driver circuit 222 may begin in a "normal" state 310 in which it operates responsive to the PWM command signal and polarity control signal produced by the DSP 210. Responsive to the overcurrent indication signal OCI indicating the presence of an overcurrent, the bridge driver circuit 222 transitions to a second state 320 in which it determines the appropriate gate drive signals to apply to the bridge circuit transistors. If the overcurrent characterization signal OCC indicates a high overcurrent, the bridge driver circuit 222 transitions to state 340 in which it applies the appropriate gate drive signals to provide a relatively high impedance between the bridge circuit output and neutral (e.g., referring to FIG. 1, the bridge driver circuit 222 turns off all of the first, second, third and fourth transistors Q1, Q2, Q3, Q4). If the overcurrent characterization signal OCC indicates a relatively low overcurrent, the bridge driver circuit 222 transitions to a state 330 in which applies the appropriate gate drive signals to provide a relatively low impedance between the bridge circuit output and neutral ((e.g., referring to FIG. 1, the bridge driver circuit 222 turns on the first and second transistors Q1, Q2 to support conduction via the neutral clamping diodes D1, D2). If an end of the overcurrent condition is indicated by the overcurrent indication signal OCI while in either of these states, the bridge driver circuit 222 transitions back to the normal PWM operation state 310.

Figure 4:
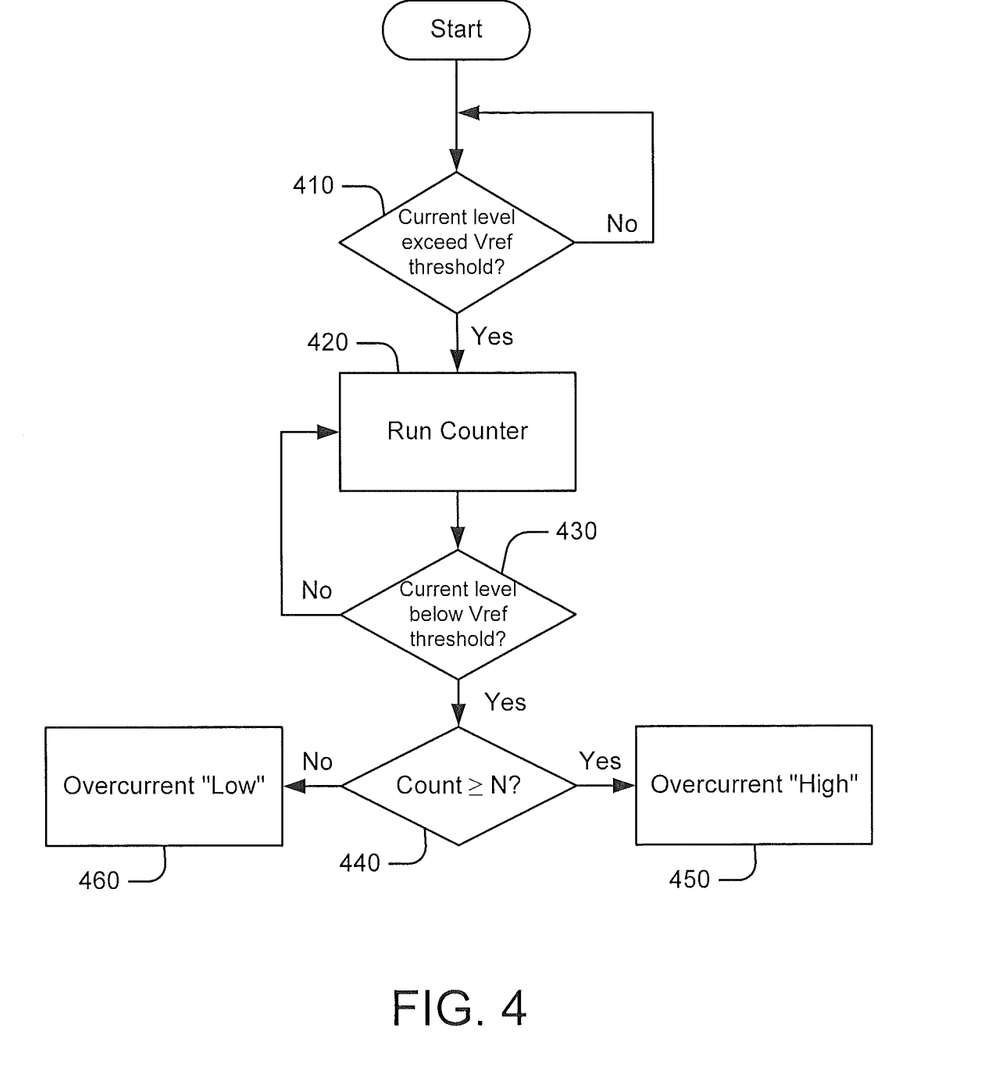
FIG. 4 is a flowchart illustrating overcurrent characterization operations of the inverter control circuit of FIG. 2 according to some embodiments.

A measure of an overcurrent may be generated by determining a pulse width of the overcurrent indication signal OCI, which represents a duration for which the inverter output current exceeds a threshold level. Referring to FIG. 4, for example, in response to detecting a change in the state of the current sense signal CS indicating a current exceeding the threshold Vref of the comparator circuit 230 (block 410), a counter may be started (block 420) to accumulate a count for a time interval until the current sense signal CS again falls below the comparator threshold (block 430). If the accumulated count is greater than or equal to a limit N, the overcurrent characterization signal OCI may be put in a logic high state indicating a high overcurrent (block 450). If the accumulated count is less than the limit N, the overcurrent characterization signal OCC may be put in a logic low state indicating a low overcurrent (block 450).

Figure 5:
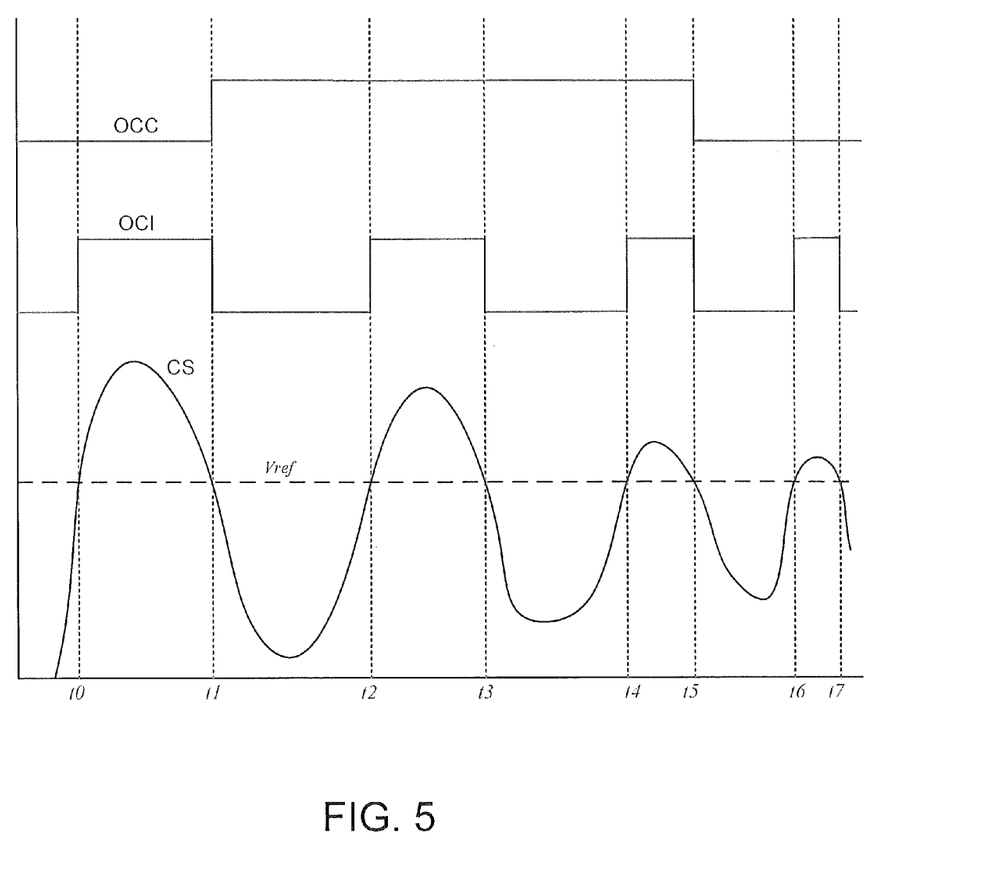
FIG. 5 is a waveform diagram illustrating operations of the inverter control circuit of FIG. 2 according to further embodiments.

Operations along these lines are illustrated in FIG. 5. Referring to FIG. 5 in conjunction with FIG. 2, at a time t0, the overcurrent characterization signal OCC may be at a high level or a low level, either as the result of a prior overcurrent episode or as a default state. At the time t0, an excursion of the current sense signal CS above the threshold Vref is detected, driving the overcurrent indication signal OCI to a logic high state and initiating a count that proceeds until the current sense signal again falls below the overcurrent indication threshold Vref at a time t1, driving the overcurrent indication signal OCI to a logic low. In the illustrated example, the count thus produced exceeds the limit N, resulting in driving the overcurrent characterization signal OCC high. Upon a subsequent excursion of the current sense signal CS above the threshold Vref at a time t2, the overcurrent indication signal OCI is again driven high, causing the bridge driver circuit 222 to put the bridge circuit in an "open" (high impedance to neutral) state due to the current state of the overcurrent characterization signal OCC. A count is also initiated, terminating when the current sense signal CS again falls below the threshold Vref at a time t3. As shown, the count still exceeds the limit N, thus causing the overcurrent characterization signal OCC to remain in the logic high state.

Upon a succeeding excursion of the current sense signal CS above the threshold Vref at a time t4, the bridge driver circuit 222 again puts the bridge circuit in an "open" state based on the current state of the overcurrent characterization signal OCC. A new count is initiated at time t4, and terminates at a subsequent time t5 when the current sense signal CS again falls below the threshold Vref and the overcurrent indication signal OCI is again deasserted. As shown, this count is now below the limit N, causing the overcurrent characterization signal OCC to be driven to a logic low value. In a next overcurrent interval from a time t6 to a time t7, the bridge driver circuit 222 puts the bridge circuit in a "grounded" (low impedance to neutral) state due to the low state of the overcurrent characterization signal OCC. During the intervals between the overcurrent states, the bridge driver circuit 222 may operate normally in response to the PWM command signal PWM and the polarity control signal PC received from the processor 210.

According to further embodiments, it may be desirable to limit the duration for which the inverter output is maintained in an "open" high-impedance state. In particular, referring to FIG. 1, when current through the output inductor $L_{out}$ approaches zero while in the "open" state, severe overvoltages for the transistors of the bridge circuit 110 can arise due to oscillations. This discontinuous mode may be avoided by limiting the time in which the bridge circuit 110 is in the "open" mode, and switching the bridge circuit 110 to the low-impedance "grounded" state before the inductor current reaches zero.

A time period T that it takes for the inductor current to reach zero can be estimated as:

$$T = I_0 L_{out} \div (V_{out} + V_x),$$

where I represents the inductor current at the time the "open" state is entered, $L_{out}$ is the inductance of the output inductor $L_{out}$, $V_{Out}$ is the output voltage at the right terminal of the output inductor $L_{out}$, and $V_x$ is the voltage at the left terminal of the output inductor $L_{out}$ (the bridge circuit output node 112). According to some embodiments of the inventive subject matter, a bridge driver circuit may use a time limit based on the estimated time T, and may switch from the "open" state to the "grounded" state when that time limit reached.

Figure 6:
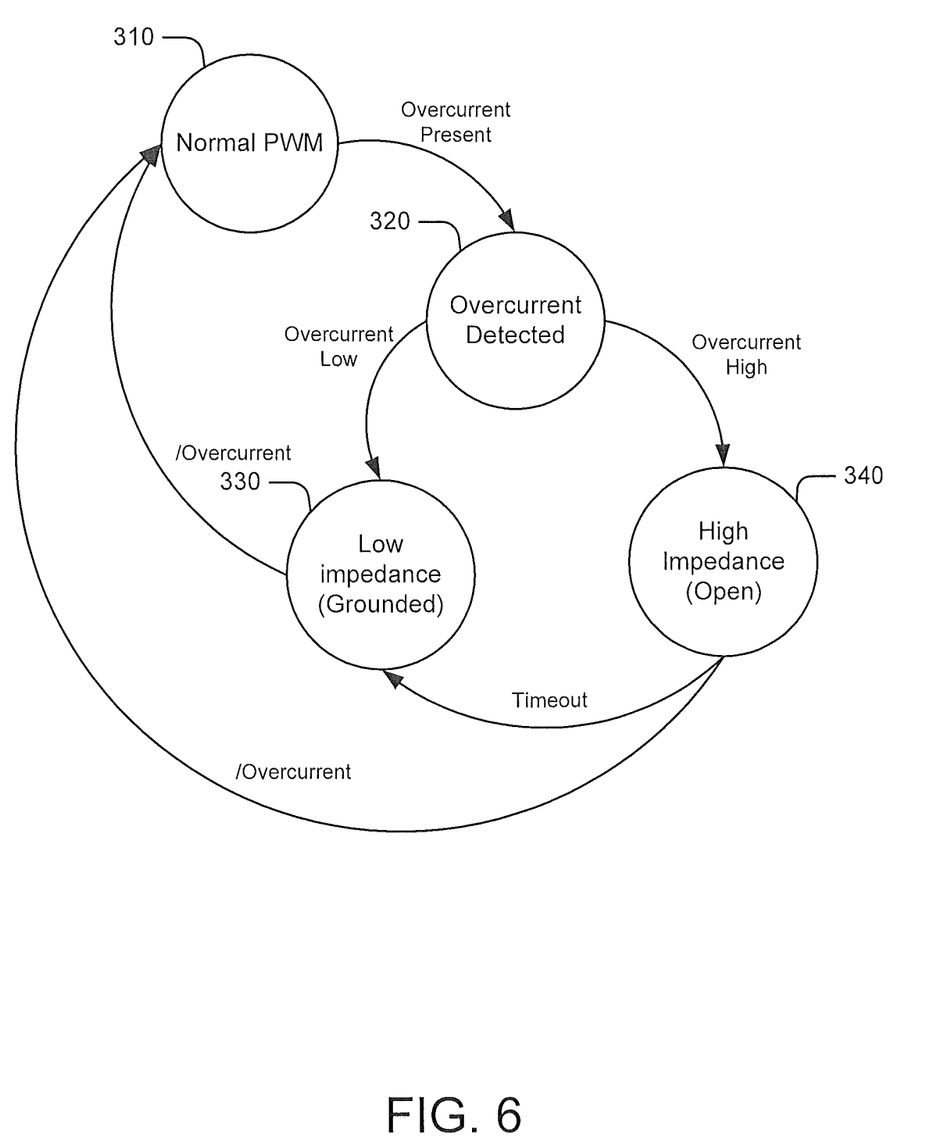
FIG. 6 is a state diagram illustrating operations of the inverter control circuit of FIG. 2 according to still further embodiments.

FIG. 6 illustrates a modification of the state machine of FIG. 3 that incorporates such a timeout limitation. The bridge driver circuit 222 of FIG. 2 may move among states 310, 320, 330, 340 as described above with reference to FIG. 3 except that, when in the high impedance "open" state 340, the bridge driver circuit 222 may monitor the duration for which it is in this state, transitioning to the low impedance "grounded" state 330 when it has reached a timeout limit.

Figure 7:
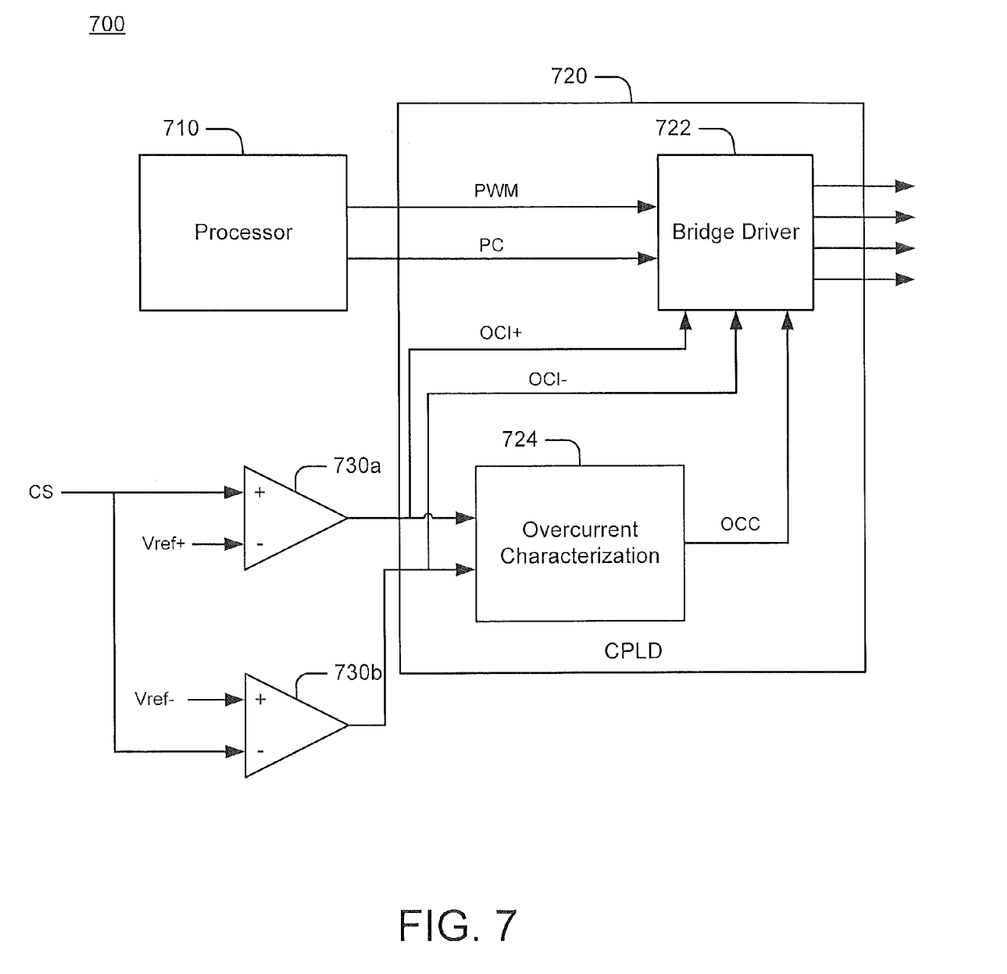
FIG. 7 is a schematic diagram illustrating an inverter control circuit according to additional embodiments.

According to further embodiments of the inventive subject matter, an inverter control circuit may also use current direction information to control overcurrent response. For example, as illustrated in FIG. 7, an inverter control circuit 700 includes a processor, such as a DSP-based microcontroller, which is configured to generate a PWM command signal PWM and a polarity control signal PC. A bridge driver circuit 722 implemented as a digital state machine in a complex programmable logic device (CPLD) 720 is configured to receive the PWM command signal PWM and the polarity control signal PC and to responsively generate gate drive signals for a multi-level bridge circuit.

The control circuit 700 also includes an overcurrent detector circuit, here shown as including first and second comparator circuits 730a, 730b configured to receive a current sense signal CS representative of the output current of the inverter. The first comparator circuit 730a generates a positive overcurrent indication signal OCI+ based on a comparison of the current sense signal CS to a positive overcurrent threshold reference signal Vref+. The second comparator circuit 730b generates a negative overcurrent indication signal OCI-based on a comparison of the current sense signal CS to a negative overcurrent threshold reference signal Vref-.

The control circuit 700 further includes an overcurrent characterization circuit 724 also implemented in the CPLD 720. The overcurrent characterization circuit 724 is configured to generate an overcurrent characterization signal OCC indicating whether the detected overcurrent is a "high" overcurrent or a "low" overcurrent by, for example, measuring a pulse width of the overcurrent indication signals OCI+, OCI− produced by the comparator circuits 731a, 730b. Responsive to the overcurrent indication signals OCI+, OCI− indicating the presence of an overcurrent, the bridge driver circuit 722 may control the manner in which it generates the gate drive signals based on the overcurrent characterization signal OCC produced by the overcurrent characterization circuit 724 to selectively put the bridge circuit into one of the "open" and "grounded" states described above.

Such an arrangement may be particularly advantageous for overcurrent control in backfeed situations in which current is flowing in a direction opposite to the current polarity of the bridge circuit. For example, referring to FIG. 1, when the inverter 100 is providing a positive voltage with the upper transistors Q1, Q3 on, in the presence of an overcurrent flowing out of the bridge circuit 110, the bridge driver circuit 722 may put the bridge circuit 110 in an "open" state (all of the transistors Q1, Q2, Q3, Q4 off) or a "grounded" state (inner transistors Q1, Q2 on) based on the overcurrent magnitude, as described above. However, if, while the bridge circuit 110 is in the positive voltage driving state, current is flowing into the bridge circuit 110, it may be desirable to constrain the bridge circuit 110 to go to the "open" state, irrespective of the magnitude of the overcurrent. Table 1 illustrates desirable overcurrent responses for different combinations of bridge circuit polarity and overcurrent polarity:

TABLE 1

| Bridge Circuit State | Current Polarity | Overcurrent Response |
|---|---|---|
| Positive | Positive | Grounded or Open |
| Positive | Negative | Open |
| Negative | Positive | Open |
| Negative | Negative | Grounded or Open |

Figure 8:
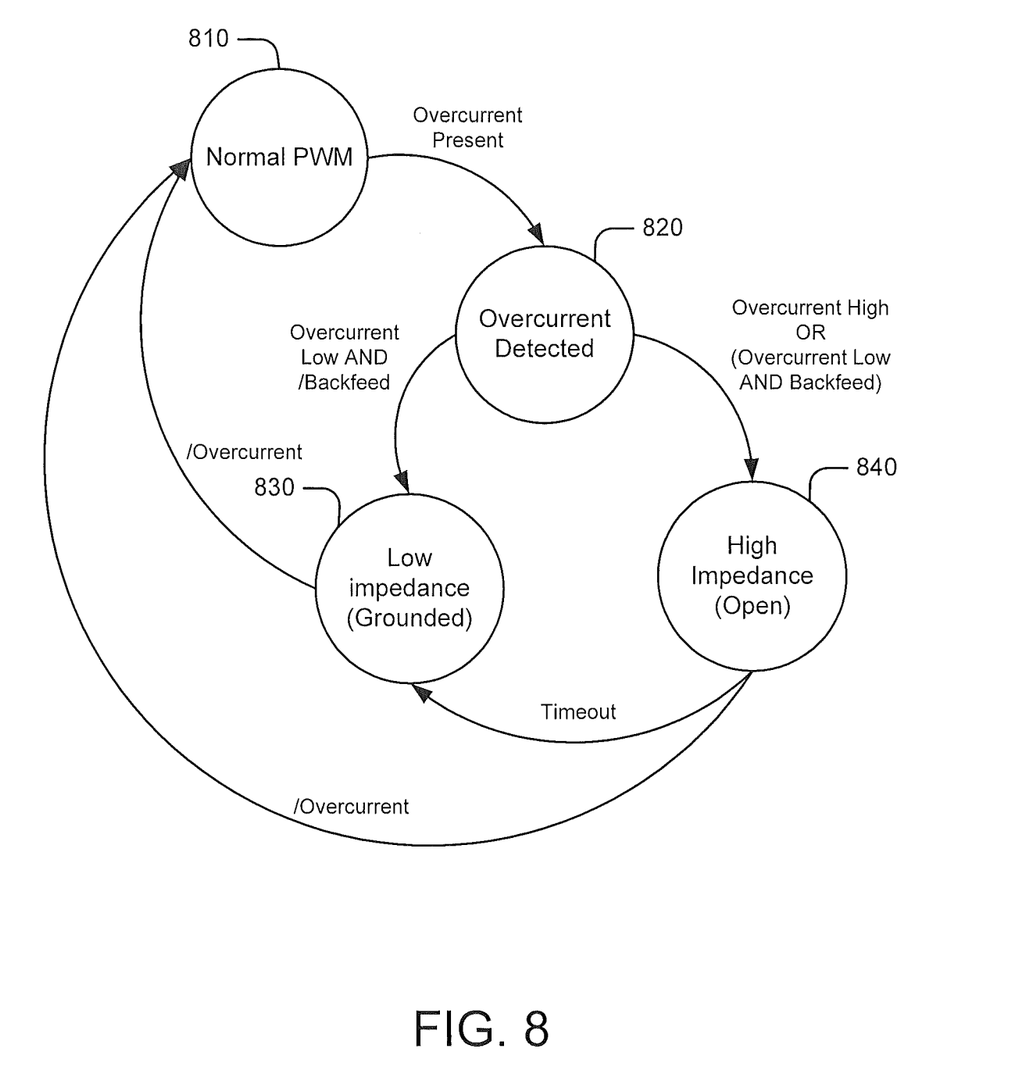
FIG. 8 is a state diagram illustrating operations of the inverter control circuit of FIG. 7 according to further embodiments.

FIG. 8 is a state diagram illustrating operations of the bridge driver circuit 722 of FIG. 7 according to some embodiments. Starting at a "normal" state 810 in which the bridge driver circuit 722 operates responsive to the PWM command signal and polarity control signal produced by the DSP 210, upon assertion of either the positive overcurrent indication signal OCI+ or the negative overcurrent indication signal OCI− indicating the presence of an overcurrent, the bridge driver circuit 722 transitions to a second state 820 in which it determines the appropriate gate drive signals to apply to the bridge circuit transistors. If the overcurrent characterization signals OCC indicates a high overcurrent, the bridge driver circuit 722 transitions to a high impedance "open" state 840. If the overcurrent characterization signal OCC indicates a relatively low overcurrent and a backfeed condition I not present based on the state of the bridge circuit and which of the positive overcurrent indication signal OCI+ or the negative overcurrent indication signal OCI− is asserted, the bridge driver circuit 722 transitions to a low impedance "grounded" state 830. If, however, a low overcurrent is indicated but a backfeed condition is also present, the bridge driver circuit 722 transitions to the "open" state 840. As also shown, a timer may be provided to monitor the duration of the "open" state, forcing transition to the "grounded" state when the timer expires and no backfeed is present. When an end of the overcurrent condition is indicated by the overcurrent indication signals OCI+, OCI−, the bridge driver circuit 722 transitions back to the normal PWM operation state 810.

Figure 9:
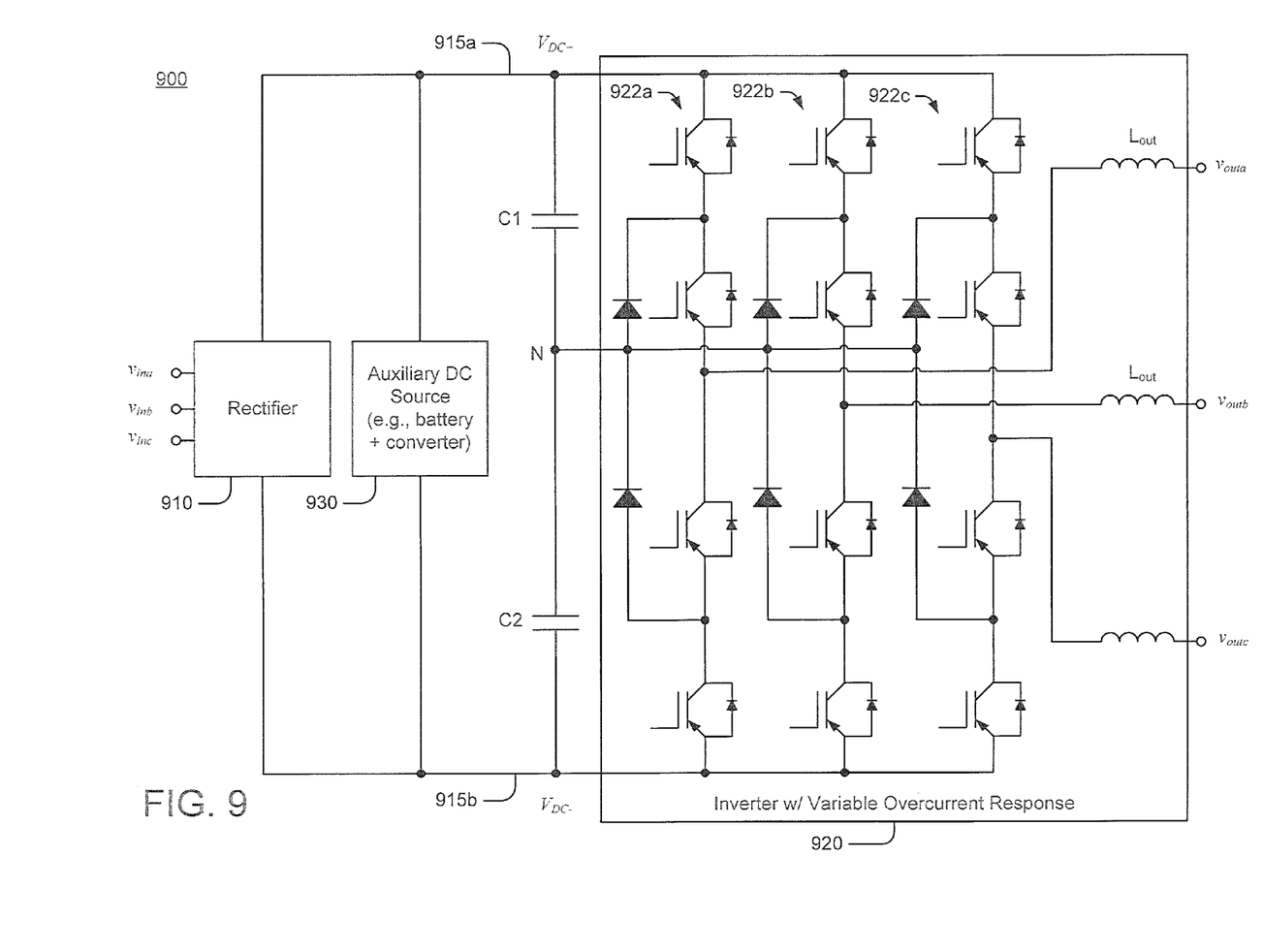
FIG. 9 is a schematic diagram illustrating an uninterruptible power supply (UPS) according to additional embodiments.

Embodiments of the inventive subject matter may be used in variety of different applications, including in inverters used for producing AC power from batteries, solar generators or wind generators, and in uninterruptible power supply (USP) systems. For example, FIG. 9 illustrates a UPS system 900 including a rectifier 910, which is configured to be coupled to a three-phase AC power source, such as a utility source, which provides A,B and phase voltages $v_{ina}$, $v_{inb}$, $v_{inc}$. The rectifier 910 produces DC voltages $V_{DC+}$, $V_{DC-}$ on positive and negative DC busses 915a, 915b, which are coupled to a neutral N by respective storage capacitors C1, C2. An auxiliary DC power source, such as a battery and/or a battery converter, is coupled to the positive and negative DC busses 915a, 915b and is configured to maintain the positive and negative DC voltage $V_{DC+}$, $V_{DC-}$ in the event of a failure of the AC power source and/or the rectifier 910. An inverter 920 comprising three bridge circuits 922a, 922b, 922c and associated inductors $L_{out}$ is coupled to the positive and negative DC busses 915a, 915b and is configured to produce three phase voltages $v_{outa}$, $v_{outb}$, $v_{outc}$ from the DC bus voltages $V_{DC+}$, $V_{DC-}$. The inverter 920 may provide variable overcurrent response along the lines discussed above with reference to FIGS. 1-8. It will be appreciated that embodiments of the inventive subject matter are applicable to wide variety of other applications.

In the drawings and specification, there have been disclosed exemplary embodiments of the inventive subject matter. Although specific terms are employed, they are used in a generic and descriptive sense only and not for purposes of limitation, the scope of the inventive subject matter being defined by the following claims.

That which is claimed:

1. An inverter comprising:
 a multilevel bridge circuit; and
 a control circuit operatively coupled to the multilevel bridge circuit and configured to detect overcurrents for an output of the inverter, to generate measures of duration of the overcurrents and to selectively put an output of the bridge circuit in a first impedance state or a second impedance state for the detected overcurrents based on the measures, wherein the first and second impedance states respectively inhibit and enable conduction between the output of the inverter and a neutral.

2. The inverter of claim 1, wherein the control circuit is configured to put the bridge circuit output in the first impedance state when a first one of the measures indicates that a duration of a first one of the overcurrents is greater than a threshold and to put the bridge circuit output in the second impedance state when a second one of the measures indicates that a duration of a second one of the overcurrents is less than the threshold.

3. The inverter of claim 1:
 wherein the bridge circuit comprises:
  first and second switches having first terminals coupled to the bridge circuit output; and
  first and second neutral clamping diodes coupled between the neutral and second terminals of the first and second switches, respectively; and
 wherein the control circuit is configured to operate first and second switches to prevent conduction via the first and second neutral clamping diodes in the first impedance state and to support conduction via the first and second neutral clamping diodes in the second impedance state.

4. The inverter of claim 1, wherein the control circuit comprises:
 a comparator circuit configured to generate an overcurrent indication signal responsive to a comparison of a current sense signal to a reference signal;
 an overcurrent characterization circuit configured to generate an overcurrent characterization signal based on a pulse width of the overcurrent indication signal; and
 a bridge driver circuit configured to control the bridge circuit responsive to the overcurrent characterization signal.

5. The inverter of claim 4, wherein the bridge driver circuit is further configured to receive a pulse width modulation signal and the overcurrent indication signal and to control the bridge circuit responsive to the pulse width modulation signal for a first state of the overcurrent indication signal and to control the bridge circuit responsive to the overcurrent status signal for a second state of the overcurrent indication signal.

6. The inverter of claim 4, further comprising a processor circuit configured to generate the pulse width modulation signal and wherein the bridge driver circuit comprises a fixed logic circuit.

7. The inverter of claim 1, wherein the control circuit is further configured to determine a direction of at least one of the detected overcurrents and to control transition of the bridge circuit output to the first and second impedance states based on the detected direction.

8. The inverter of claim 7, wherein the control circuit is configured to control transition of the bridge circuit output to the first impedance state or the second impedance state based on the detected direction and a state of the bridge circuit.

9. An uninterruptible power supply (UPS) comprising the inverter of claim 1.

10. An inverter comprising:
 a multilevel bridge circuit; and
 a control circuit operatively coupled to the multilevel bridge circuit and configured to detect an overcurrent for an output of the inverter, to generate a measure of a duration of the overcurrent and to selectively put an output of the bridge circuit in a first impedance state or a second impedance state based on the measure, wherein the control circuit is further configured to determine an elapsed time after the bridge circuit output enters the first impedance state in response to the detected overcurrent and to transition the bridge circuit output to the second impedance state responsive to the elapsed time meeting a predetermined criterion.

11. An inverter comprising:
a multilevel bridge circuit; and
a control circuit operatively coupled to the multilevel bridge circuit and configured to detect an overcurrent and a direction thereof for an output of the inverter, to generate a measure of a duration of the overcurrent and to selectively put an output of the bridge circuit in a first impedance state or a second impedance state based on the measure and the detected direction, wherein the control circuit is configured to selectively put the bridge circuit output in the first impedance state or the second impedance states based on the measure when the detected direction indicates an absence of a backfeed and wherein the control circuit is further configured to constrain the bridge circuit output to transition to the first impedance state responsive to the detected overcurrent when the detected direction indicates a presence of the backfeed, irrespective of the measure of the overcurrent.

12. The inverter of claim 11, wherein the control circuit is configured to selectively put the bridge circuit output in the first impedance state or the second impedance state based on the detected direction and a state of the bridge circuit.

13. The inverter of claim 12, wherein the first impedance state provides a first impedance between the bridge circuit output and a neutral and the second impedance state provides a second impedance between the bridge circuit output and the neutral.

14. The inverter of claim 13, wherein the control circuit is configured to put the bridge circuit output in the first impedance state when the duration of the overcurrent is greater than a threshold and to put the bridge circuit output in the second impedance state when the duration of the overcurrent is less than the threshold, and wherein the first impedance is greater than the second impedance.

15. The inverter of claim 11, wherein the control circuit is configured to detect the backfeed based on the detected direction and a state of the bridge circuit.

16. The inverter of claim 11:
wherein the bridge circuit comprises:
first and second switches having first terminals coupled to the bridge circuit output; and
first and second neutral clamping diodes coupled between the neutral and second terminals of the first and second switches, respectively; and
wherein the control circuit is configured to operate first and second switches to prevent conduction via the first and second neutral clamping diodes in the first impedance state and to support conduction via the first and second neutral clamping diodes in the second impedance state.

17. A UPS comprising the inverter of claim 11.

18. A method of operating a multi-level inverter, the method comprising:
detecting overcurrents for an output of the inverter;
generating measures of duration of the overcurrents; and
selectively putting an output of a bridge circuit of the inverter in a first impedance state or a second impedance state for the detected overcurrents based on the measures, wherein the first and second impedance states respectively inhibit and enable conduction between the output of the inverter and a neutral.

19. The method of claim 18, wherein selectively putting an output of a bridge circuit of the inverter in a first impedance state or a second impedance state for the detected overcurrents based on the measures comprises putting the bridge circuit output in the first impedance state when a first one of the measures indicates that a duration of a first one of the overcurrents is greater than a threshold and putting the bridge circuit output in the second impedance state when a second one of the measures indicates that a duration of a second one of the overcurrents is less than the threshold.

20. The method of claim 18, further comprising detecting a direction of at least one of the detected overcurrents and wherein selectively putting an output of a bridge circuit of the inverter in a first impedance state or a second impedance state for the detected overcurrents based on the measures comprises selectively putting the bridge circuit output in the first impedance state or the second impedance state based on the detected direction.

21. The method of claim 20, wherein selectively putting the bridge circuit output in the first impedance state or the second impedance state based on the detected direction comprises selectively putting the bridge circuit output in the first impedance state or the second impedance state based on the detected direction and a state of the bridge circuit.

* * * * *